Figure 1:
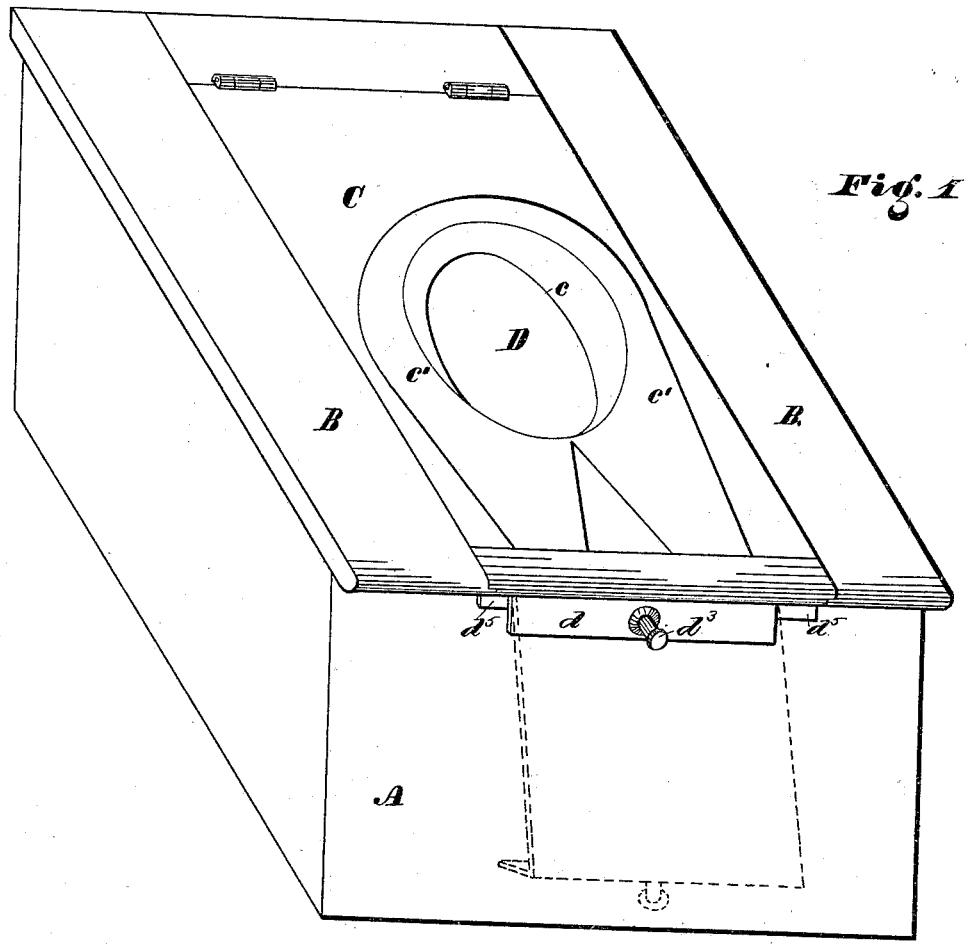

R. A. VAN COURT.
PRIVY SEAT.

No. 188,699. Patented March 20, 1877.

2 Sheets—Sheet 1.

Witnesses
Saml. J. Van Staveren
By Chas A. Higgins

Inventor
Robt A. Van Court
Connolly Bros., Attorneys

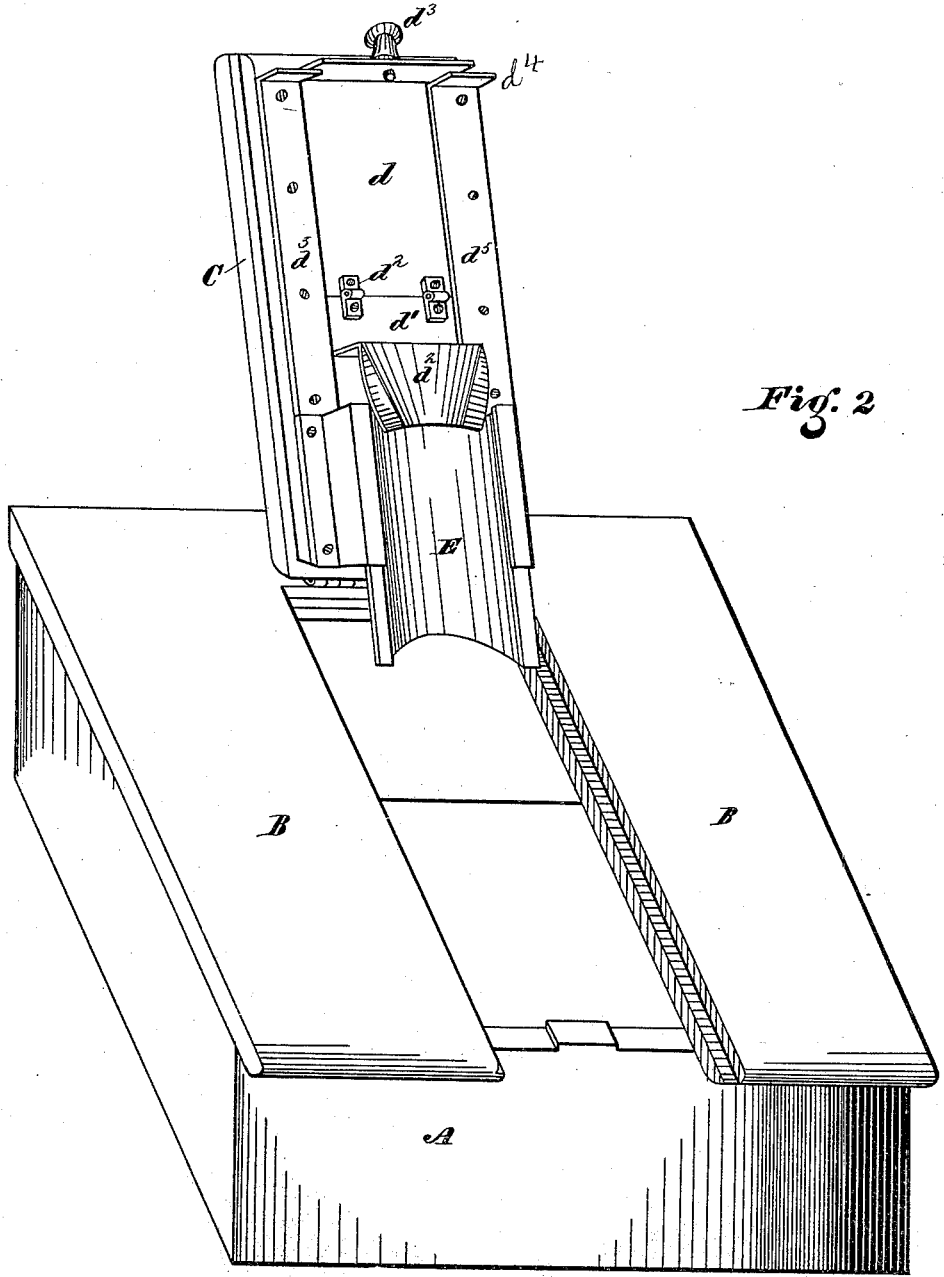

UNITED STATES PATENT OFFICE.

ROBERT A. VAN COURT, OF PHILADELPHIA, PENNSYLVANIA.

IMPROVEMENT IN PRIVY-SEATS.

Specification forming part of Letters Patent No. 188,699, dated March 20, 1877; application filed February 24, 1877.

*To all whom it may concern:*

Be it known that I, ROBERT A. VAN COURT, of Philadelphia, in the county of Philadelphia and State of Pennsylvania, have invented certain new and useful Improvements in Privy-Seats; and I do hereby declare the following to be a full, clear, and exact description of the invention, such as will enable others skilled in the art to which it pertains to make and use it, reference being had to the accompanying drawings, which form part of this specification, in which—

Figure 1 is a perspective of a seat with the lid down and the aperture therein covered. Fig. 2 is a perspective of a seat with the lid raised.

My improvements consist, essentially, as follows: First, in the provision of a jointed slide, which moves beneath the seat for the purpose of closing the opening therein, and preventing the escape of noxious gases from the well, said slide, when drawn out to uncover the opening, being adapted to swing down and rest against the vertical side of the seat, out of the way of the limbs of the occupant of the latter; second, in the provision of a shield or guard, fastened to the under side of the hinged seat, said shield being designed to prevent the "splashing" with urine of the fixed sides of the seat when the said hinged portion is raised in the customary manner to form a urinal opening.

Referring to the accompanying drawing, A designates the front vertical side of a privy-seat, and B B the fixed boards on either side of the hinged portion C. Said hinged portion is formed with an opening, $c$, the edge or border of which is "upholstered," in any suitable manner, with cloth, velvet, or other equivalent soft and warm material, $c'$. Beneath said opening is a slide, D, formed in two sections, $d$ $d^1$, hinged at $d^2$. The section $d$ has a handle or pull, $d^3$, while the section $d^1$ is provided with a stop, $d^4$, to prevent the slide from being drawn wholly out of the guides or ways $d^5$, in which it is supported and moves. When said slide is drawn out to uncover the opening $c$ the front section $d$ swings down against the side A, out of the way of the limbs of the occupant of the seat. E is a concave shield, fastened to the under side of the hinged seat C, serving, when said hinged seat is raised, to form a urinal opening, to prevent the splashing of urine on the fixed boards B B on either side of said opening.

The principles of construction and provision herein set forth may be applied to commodes and other like conveniences without departing from the spirit of my improvements.

What I claim as my invention is—

1. In combination with a privy-seat, a hinged slide, D, adapted to cover the opening in said seat when pushed in, and, when drawn out, to swing down out of the way against the front side or support of said seat, substantially as shown and described.

2. In combination with a hinged privy-seat, C, the concave shield or guard E, fastened on the under side of said seat, substantially as described, for the purpose set forth.

In testimony that I claim the foregoing I have hereunto set my hand this 13th day of February, 1877.

ROBERT A. VAN COURT.

Witnesses:
SAML. J. VAN STAVOREN,
CHAS. F. VAN HORN.